US009726821B2

(12) United States Patent
Murray et al.

(10) Patent No.: US 9,726,821 B2
(45) Date of Patent: Aug. 8, 2017

(54) ADIABATIC ELLIPTICAL OPTICAL COUPLER DEVICE

(71) Applicant: RANOVUS INC., Ottawa (CA)

(72) Inventors: Kyle Murray, Vancouver (CA); Dylan Logan, Ottawa (CA); Christopher James Brooks, Nepean (CA); Ryan Murray Hickey, Stittsville (CA)

(73) Assignee: RANOVUS INC., Ottawa, Ontario (CA)

( * ) Notice: Subject to any disclaimer, the term of this patent is extended or adjusted under 35 U.S.C. 154(b) by 0 days.

(21) Appl. No.: 14/955,707

(22) Filed: Dec. 1, 2015

(65) Prior Publication Data

US 2017/0153392 A1   Jun. 1, 2017

(51) Int. Cl.
*G02B 6/10* (2006.01)
*G02B 6/122* (2006.01)
*G02B 6/42* (2006.01)
*G02B 6/12* (2006.01)

(52) U.S. Cl.
CPC ......... *G02B 6/1228* (2013.01); *G02B 6/4212* (2013.01); *G02B 2006/12061* (2013.01); *G02B 2006/12102* (2013.01); *G02B 2006/12121* (2013.01)

(58) Field of Classification Search
CPC ......... G02B 6/10; G02B 6/26; G02B 6/02042
USPC ........................................................ 385/126
See application file for complete search history.

(56) References Cited

U.S. PATENT DOCUMENTS

| 5,577,141 | A  | * | 11/1996 | Adar et al. ................... 385/43 |
| 5,710,847 | A  |   | 1/1998  | Takano et al. |
| 6,253,009 | B1 | * | 6/2001  | Lestra et al. ................. 385/50 |
| 7,643,710 | B1 | * | 1/2010  | Liu .............................. 385/43 |
| 7,783,146 | B2 | * | 8/2010  | Blauvelt et al. ............... 385/50 |
| 7,920,322 | B2 | * | 4/2011  | Oh et al. ...................... 359/344 |
| 8,027,556 | B2 | * | 9/2011  | Tokushima .................... 385/39 |

(Continued)

FOREIGN PATENT DOCUMENTS

DE          10236800 B3     1/2004

OTHER PUBLICATIONS

Hatori, Nobuaki, et al., "A Hybrid Integrated Light Source on a Silicon Platform Using a Trident Spot-Size Converter", Journal of Lightwave Technology, vol. 32, No. 7, Apr. 1, 2014, 2014 IEEE.

(Continued)

*Primary Examiner* — Kaveh C Kianni
(74) *Attorney, Agent, or Firm* — Perrr + Currier, Inc.

(57) ABSTRACT

An adiabatic elliptical optical coupler device is provided comprising: a substrate having an edge; a first waveguide on the substrate, the first waveguide comprising a constant-width region and a tapered region terminating at the edge of the substrate, the tapered region having a smaller width at the edge than at the constant-width region; and, a pair of second waveguides on the substrate, and located on either side of the tapered region, each of the pair of the second waveguides terminating at the edge at a first end and extending to a second end adjacent the constant-width region, and distal the first end; at least a portion of each of the pair of second waveguides being tapered, and optically coupled to the first waveguide to transition a mode of an optical signal in the first waveguide from an elliptical mode at the edge towards a confined mode.

16 Claims, 5 Drawing Sheets

(56) References Cited

U.S. PATENT DOCUMENTS

| | | | |
|---|---|---|---|
| 9,081,138 B2* | 7/2015 | Ho et al. | 385/15 |
| 2003/0007719 A1* | 1/2003 | Forrest et al. | 385/14 |
| 2003/0007766 A1* | 1/2003 | Galarza et al. | 385/132 |
| 2003/0235369 A1* | 12/2003 | Grosjean et al. | 385/49 |
| 2009/0245728 A1* | 10/2009 | Cherchi et al. | 385/28 |
| 2009/0324163 A1* | 12/2009 | Dougherty et al. | 385/14 |
| 2010/0142579 A1* | 6/2010 | Leem et al. | 372/50.11 |
| 2012/0230635 A1* | 9/2012 | Yoshida | 385/43 |
| 2014/0126855 A1* | 5/2014 | Onishi | 385/3 |
| 2014/0270620 A1* | 9/2014 | Anderson et al. | 385/11 |
| 2015/0260915 A1* | 9/2015 | Kitamura et al. | 385/14 |
| 2015/0270684 A1* | 9/2015 | Suzuki et al. | 385/11 |
| 2015/0285997 A1* | 10/2015 | Pan et al. | 385/43 |
| 2015/0316720 A1* | 11/2015 | Yang et al. | 385/129 |
| 2015/0338577 A1* | 11/2015 | Shi et al. | 385/11 |

OTHER PUBLICATIONS

Nobuaki Hatori et al:, A Novel Spot Size convertor for Hybrid Integrated Light Sources on Photonics- Electronics Convergence System, 8th IIEEE Int. Conf. Group IV Photonics, San Diego, Aug. 2012 (Aug. 2012) XP03245661.

Extended European Search Report dated Apr. 10, 2017 for European Patent Application No. 16201632.3.

\* cited by examiner

ADIABATIC ELLIPTICAL OPTICAL COUPLER DEVICE

The specification relates generally to telecommunication devices, and specifically to an adiabatic elliptical optical coupler device.

BACKGROUND

Many optical telecommunications devices require a low loss interface between a laser chip and a waveguide of a Photonic Integrated Circuit (PIC). In addition, it is desirable for this interface to be generally insensitive to alignment. A laser chip generally produces a small spot that is elliptical in shape, with an aspect ratio of between 2:1 and 3:1. Using one or more lenses, this divergent beam is collected and focused onto a PIC facet of the waveguide, the mode at the PIC facet having the same aspect ratio and size as the divergent beam focused by the one or more lenses; furthermore, the PIC facet of the waveguide is generally followed by a structure to taper the divergent beam received at the PIC facet down to a tightly confined waveguide mode used elsewhere on the PIC. The degree of spot size matching at the PIC facet and the loss induced by the mode conversion in the taper structure determine the overall coupler loss, which should be minimized.

Typical PIC edge couplers involve a simple waveguide taper, which does not provide independent control of spot size and mode asymmetry. For instance, the spot size of a confined mode in the waveguide is determined by the width of the waveguide at the end of the taper, with larger widths corresponding to smaller spot sizes. Alternatively, the ellipticity of the mode is determined by the ratio of the width of the waveguide to the thickness of the waveguide at the end of the taper, with more elliptical modes corresponding to waveguides with more rectangular cross-sections. Therefore, simple waveguide tapers are not appropriate to meet the demands of direct lens-coupling to a laser diode chip.

While sub-wavelength grating (SWG) waveguides can be used to reduce the waveguide index and produce larger spot size for a given waveguide width at a facet, they do not provide sufficient design flexibility.

Other technologies use local modifications of the refractive index and geometry of the cladding (the region surrounding the taper) to further control the spot size. However, this involves modifications to the standard foundry process and leads to compatibility issues with other structures.

Other solutions have used adiabatic mode spot-size converters, but these are intended for butt-joint (i.e. no lens) coupling, for example see N. Hatori, et al., "A novel spot size convertor for hybrid integrated light sources on photonics-electronics convergence system," presented at the 8th IEEE Int. Conf. Group IV Photonics, San Diego, Calif., USA, Aug. 2012, Paper ThB2. For example, the device of Hatori produces a much smaller spot size and requires that the laser chip have close proximity to the PIC facet with extremely tight alignment tolerances, which generally requires flip-chip mounting, and leads to a coupling loss of 2.5 dB.

SUMMARY

The present specification provides an adiabatic elliptical optical coupler device that includes a substrate having an edge, a first waveguide on the substrate that has a tapered region terminating at the edge, and a pair of second waveguides on the substrate, located on either side of the tapered region of the first waveguide, each of the pair of second waveguides also terminating at the edge at a first end and extending only partially along a length of the first waveguide. The ends of all three waveguides located at the edge of the substrate are generally aligned with each other along a common line. At least a portion of each of the pair of second waveguides are tapered, for example becoming narrower further from the edge, and spaced from the first waveguide to be optically coupled thereto. Hence, an elliptical optical signal from a laser/lens system, which impinges on the ends of the waveguides enter all three waveguides, and light from the pair of second waveguides couples into the central first waveguide such that a mode of an optical signal in the first waveguide transitions from an elliptical mode at the edge towards a mode confined in the first waveguide. A theoretical loss of a successful prototype of such a device is about 1 dB, and measured losses of the successful prototype was around 1.6 dB, as measured using a 5 µm×10 µm fiber.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as connected physically, electronically, or any combination thereof, according to context. In general, components that are electrically connected are configured to communicate (that is, they are capable of communicating) by way of electric signals. According to context, two components that are physically coupled and/or physically connected may behave as a single element. In some cases, physically connected elements may be integrally formed, e.g., part of a single-piece article that may share structures and materials. In other cases, physically connected elements may comprise discrete components that may be fastened together in any fashion. Physical connections may also include a combination of discrete components fastened together, and components fashioned as a single piece.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

A device comprising: a substrate having an edge; a first waveguide on the substrate, the first waveguide comprising a constant-width region and a tapered region terminating at the edge of the substrate, the tapered region having a smaller width at the edge than at the constant-width region; and, a pair of second waveguides on the substrate, and located on either side of the tapered region of the first waveguide, each of the pair of the second waveguides terminating at the edge at a first end and extending to a second end adjacent the constant-width region of the first waveguide, the second end distal the first end; at least a portion of each of the pair of second waveguides being tapered, and optically coupled to the first waveguide to transition a mode of an optical signal in the first waveguide from an elliptical mode at the edge towards a confined mode in the first waveguide in the constant-width region.

Each of the pair of second waveguides can have a larger width at the edge than adjacent an interface between the constant-width region and the tapered region of the first waveguide.

Each of the pair of second waveguides can be symmetrically tapered about a longitudinal axis from the edge to adjacent an interface between the constant-width region and the tapered region of the first waveguide.

Each of the pair of second waveguides can have a width at the edge that is larger than adjacent an interface between the constant-width region and the tapered region of the first waveguide, the width each of the pair of second waveguides at the edge being smaller than a respective width of the first waveguide at the edge.

Each of the pair of second waveguides can be tapered, with a larger width at the edge and a smaller width adjacent an interface between the constant-width region and the tapered region of the first waveguide.

Each of the pair of second waveguides can comprise: a respective constant-width region extending from the edge; and a tapered region extending from the constant-width region, the tapered region becoming narrower adjacent an interface between the constant-width region and the tapered region of the first waveguide.

Each of the pair of second waveguides can comprise inner edges adjacent the first waveguide that are parallel and tapering of each of the pair of second waveguides occurs at an outer edge.

Each of the substrate, the first waveguide and the pair of second waveguides can comprise silicon.

Each of the substrate, the first waveguide and the pair of second waveguides comprises a photonic integrated circuit.

The device can further comprise an optical circuit in communication with the first waveguide located at an end opposite the tapered region.

The device can further comprise an optical device optically coupled to first waveguide and the pair of second waveguides at the edge, the optical device configured to receive optical output therefrom, the optical output comprising the elliptical mode. The optical device can comprise a semiconductor optical amplifier (SOA) or an external cavity laser (ECL).

The device can further comprise a laser configured to output the optical signal having the elliptical mode towards the edge.

The device can further comprise a laser aligned with the tapered region of the first waveguide at the edge.

The device can further comprise: a laser configured to output the optical signal having the elliptical mode towards the edge; and at least one lens located between the laser and the edge, the at least one lens configured to focus the optical signal on respective ends of each of the first waveguide and the pair of second waveguides. The at least one lens can be further configured to collimate the optical signal prior to focusing the optical signal on the respective ends of each of the first waveguide and the pair of second waveguides. The laser and at least one lens can be centered on respective ends of each of the first waveguide and the pair of second waveguides.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
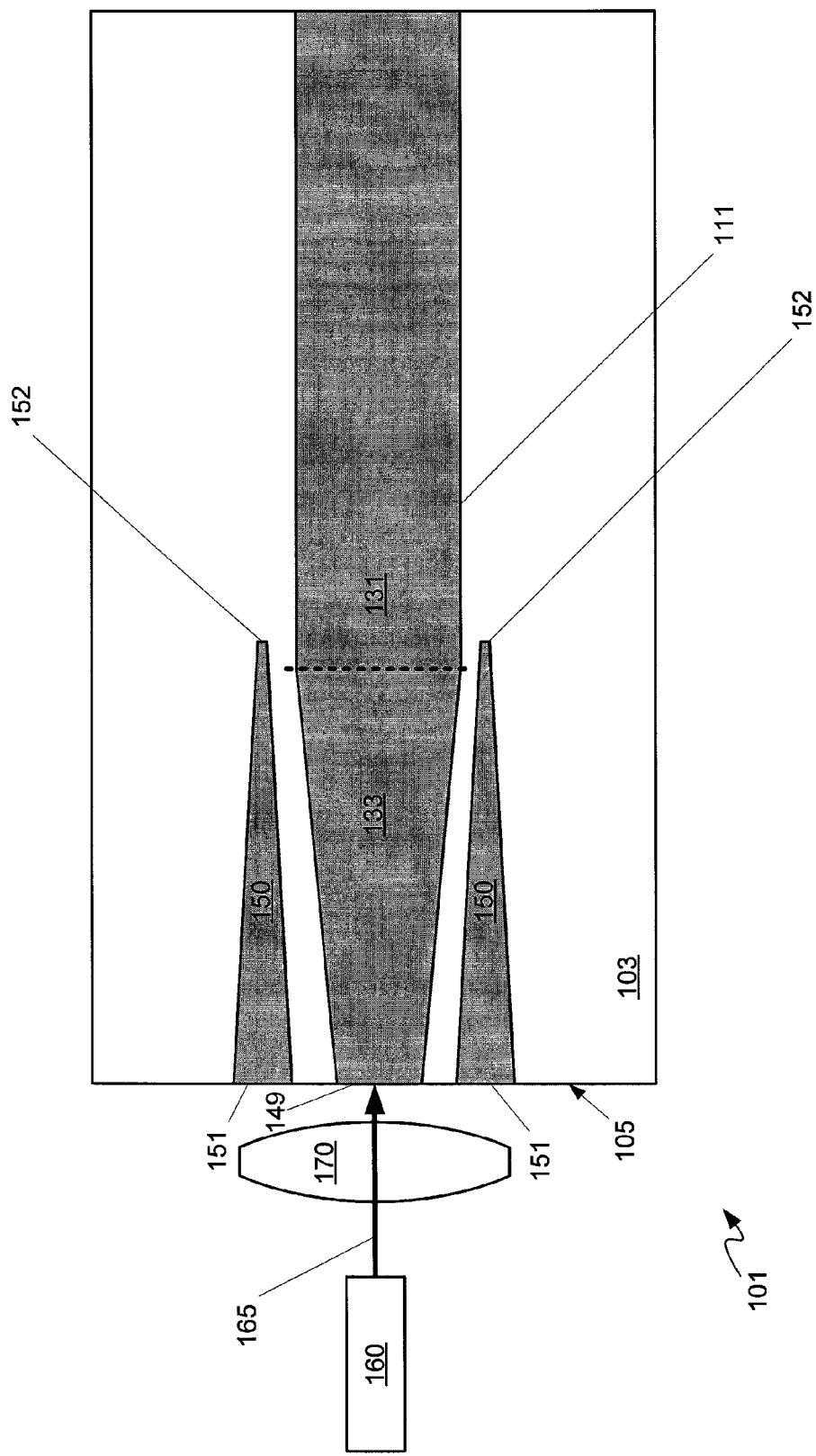
FIG. 1 depicts a top perspective view of an adiabatic elliptical optical coupler device, according to non-limiting implementations.

FIG. 1 depicts a schematic top perspective view of a device 101 comprising: a substrate 103 having an edge 105; a first waveguide 111 on substrate 103, first waveguide 111 comprising a constant-width region 131 and a tapered region 133 terminating at edge 105 of substrate 103, tapered region 133 having a smaller width at edge 105 than at constant-width region 131 (e.g. at an end 149); and, a pair of second waveguides 150 on substrate 103, and located on either side of tapered region 133 of first waveguide 111, each of the pair of second waveguides 150 terminating at edge 105 at a first end 151 and extending to a second end 152 adjacent constant-width region 131 of first waveguide 111, second end 152 distal first end 151; at least a portion of each of the pair of the second waveguides 150 being tapered, and optically coupled to first waveguide 111 to transition a mode of an optical signal in first waveguide 111 from an elliptical mode at edge 105 towards a confined mode of circular mode in constant-width region 131. First waveguide 111 and second waveguides will collectively be referred to hereafter as waveguides 111, 150. Further, for clarity, a stippled line is provided to delineate between constant-width region 131 and tapered region 133 of first waveguide 111, however constant-width region 131 and tapered region 133 of first waveguide 111 are appreciated to be integrated with each other. In addition it is appreciated that FIG. 1 is not necessarily to scale; for example, in one non-limiting prototype, end 149 is about 180 nm in width, and ends 151 are each in a range of about 150 nm to about 160 nm in width. It is yet further appreciated that a confined mode of first waveguide 111 comprises a mode confined in first waveguide 111.

As depicted, device 101 further comprises, and/or is configured to interface with, a laser 160 aligned with tapered region 133 of first waveguide 111 at edge 105, and specifically centred on waveguides 111, 150 at edge 105. Hence, laser 160 is configured to produce an optical signal 165 received into waveguides 111, 150 at edge 105. In some implementations, laser 160 is integrated into device 101 while, in other implementations, laser 160 is external to device 101 but can be integrated into packaging common to device 101. Specifically, device 101 further comprises, and/or is configured to interface with laser 160, and laser 160 can be configured to output optical signal 165 having an elliptical mode (and/or mode) towards edge 105, as described in more detail below.

Similarly, as depicted device 101 further comprises, and/or is configured to interface with, at least one lens 170 configured to focus optical signal 165 from laser 160 into tapered region 133 of first waveguide 111 at edge 105, and specifically at least one lens 170 is centred on waveguides 111, 150 at edge 105. Furthermore at least one lens 170 is located between laser 160 and edge 105, at least one lens 170 configured to focus optical signal 165 on respective ends 149, 151 of each of first waveguide 111 and pair of second waveguides 150. In particular, at least one lens 170 is further configured to collimate optical signal 165 prior to focusing optical signal 165 on respective ends 149, 151 of each of first waveguide 111 and pair of second waveguides 150. For example, optical signals from lasers are generally divergent and hence at least one lens 170 can first collimate optical signal 165 and then focus optical signal 165 onto respective ends 149, 151 of each of first waveguide 111 and pair of second waveguides 150; for example, while only one lens is depicted, at least one lens 170 can comprise two or more lenses, a first lens configured to collimate optical signals from laser 160, and a second lens, located between the first lens and edge 105, the second lens configured to focus collimated light from the first lens onto respective ends 149, 151 of each of first waveguide 111 and pair of second waveguides 150. In some implementations, at least one lens 170 is integrated into device 101 while, in other implementations, at least one lens 170 is external to device 101 but can be integrated into packaging common to device 101.

It us further appreciated that each of pair of second waveguides 150 has a larger width at edge 105 than adjacent an interface between constant-width region 131 and tapered region 133 of first waveguide 111. In other words, each of pair of second waveguides 150 are also tapered, with larger width at end 151 and a smaller width at end 152. Furthermore, a width each of pair of second waveguides 150 at edge 105 is generally smaller than a respective width of end 149 of first waveguide 111 at edge 105. For example, in some implementations a width of end 149 is about 10% to about 30% larger than a width of ends 151. However, such other differences in width are within the scope of present implementations, and can such differences depend on a spot size of optical signal 165, a separation between first waveguide 111 and each of pair of second waveguides 150, and the like.

From FIG. 1 is it is further apparent that a width of constant-width region 131 is larger than ends 152 of each of pair of second waveguides 150; for example, a width of constant-width region 131 is selected so that a confined mode of first waveguide 111 in constant-width region 131 is compatible with other optical devices that receive the confined mode, and hence to minimize losses there between. Either way, a width of ends 152 of each of pair of second waveguides 150 is smaller than a width of end 149 of first waveguide 111 at edge 105.

Furthermore, first waveguide 111 and the pair of second waveguides 150 comprise a photonic integrated circuit (PIC). While not depicted, device 101 can further comprise an optical circuit in communication with first waveguide 111 located at an end opposite tapered region 133.

For example device 101 can comprises components of a transmitter in an optical telecommunications system (e.g. an optical telecommunications transmitter) configured to produce, and transmit, modulated optical signals and/or multiplexed optical signals at one or more given optical frequencies, and one or more given data rates, the modulated optical signals having data encoded therein. As such, device 101 can further comprise further waveguides, optical modulators (including, but not limited to, optical ring resonators) and the like, as well as optical coupling devices that convey such optical signals to one or more optical transmission lines, such as optical fibres. For example, device 101 can comprise a photonic integrated circuit that includes modulating devices and/or optical busses, including waveguides 111, 150. As such, the one or more given optical frequencies of optical signal 165 can comprise one or more given carrier optical frequencies including, but not limited to, optical frequencies used in optical telecommunications in a range of about 184.5-238 THz; however other optical frequencies are within the scope of present implementations. In yet further implementations optical circuits of device 101 can demodulate optical signals.

However, while such a transmitter assumes that optical signals are received by device 101 for modulation, in other implementations, device 101 can be used to couple to optical devices configured to receive optical output from first waveguide 111 and waveguides 150 at edge 105, the optical output comprising an elliptical mode, the optical device including, but not limited to, a semiconductor optical amplifier (SOA) and an external cavity laser (ECL). In other words, while device 101 is described with reference to receiving an elliptical optical signal at into each of waveguides 111, 150 at ends 149, 151, and transitioning optical signal 165 from an elliptical mode towards a confined mode of first waveguide 111, in other implementations an optical signal can be emitted from waveguides 111, 150 at ends 149, 151, and waveguides 111, 150 can convert an optical signal in a confined mode of first waveguide 111 in constant-width region 131 towards an elliptical mode that is emitted from waveguides 111, 150 at edge 105 at ends 149, 151.

Hence, device 101 comprises an optical coupler configured to convey optical signal 165 into and/or out of device 101. For example, attention is next directed to FIG. 2 which depicts an end view of device 101, and specifically a view of edge 105 and ends 149, 151 of waveguides 111, 150. Hence, ends 149, 151 of waveguides 111, 150 generally comprise PIC facets which received optical signal 165 therein and alternatively emit an optical signal therefrom.

Figure 2:
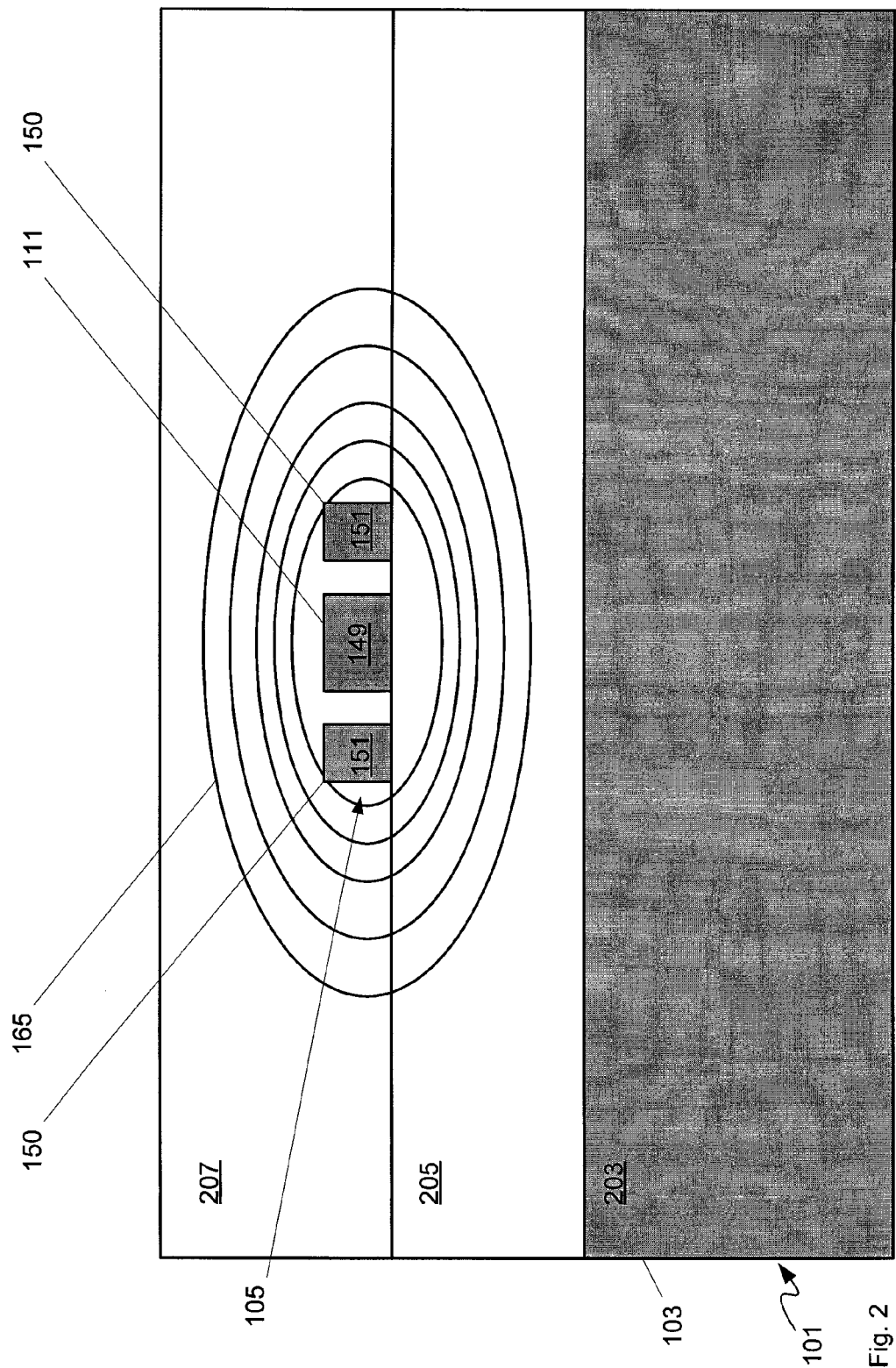
FIG. 2 depicts an end view of the device of FIG. 1, according to non-limiting implementations.

In addition to ends 149, 151 of each of waveguides 111, 150, FIG. 2 depicts a non-limiting structure of substrate 103 including a supporting portion 203 (e.g. a main part of substrate 103, which can generally be unoxidized), a thermal oxide 205 and an encapsulating oxide 207, however other structures of substrate 103 are within the scope of present implementations. Encapsulating oxide 207 can further encapsulate any other optical circuits present at device 101, for example optical circuits for modulating and/or demodulating optical signals. In some implementations, each of substrate 103, first waveguide 111 and the pair of second waveguides 150 comprises silicon and any oxides present, including oxides 205, 207, in device 101 can comprise one or more silicon oxides. However other materials are within the scope of present implementations.

FIG. 2 further depicts a cross-section of optical signal 165 from laser 160 being received at ends 149, 151 of waveguides 111, 150. Specifically, optical signal 165 is elliptical, and is generally centred on waveguide 111. Furthermore schematic and/or approximate relative depth and/or height and/or thickness of each of waveguides 111, 150 are also depicted, relative to widths of ends 149, 151, though FIG. 2 is not necessarily to scale. For example, a depth and/or height and/or thickness of each of waveguides 111, 150 can be the same and/or similar, and in a range of 150 to 300 nm, with widths of each of ends 149, 151 being less than the depth and/or height and/or thickness of each of waveguides 111, 150. However, such dimensions can vary.

Similarly, a relative depth and/or height and/or thickness of each of oxides 205, 207 is also depicted; typically, such oxides 205, 207 can have a thickness in the range of about 1 μm to about 5 μm, though other thicknesses are within the scope of present implementations. Furthermore, depth and/or height and/or thickness of supporting portion 203 are generally very thick compared to thicknesses of other components of device 101 (e.g. a thickness of a silicon substrate and/or any other suitable substrate material, and the like).

In general the elliptical spot size of optical signal 165 is dependent on laser 160 as well as at least one lens 170, and a distance between laser 160 and edge 105. In general, widths of ends of waveguides 111, 150 and their separation are selected to match the elliptical spot size of optical signal 165. Similarly, a respective length of each of each of tapered region 133 and waveguides 150 are selected to minimize adiabatic mode conversion loss between waveguides 150 and waveguide 150, which can be determined heuristically and/or theoretically.

Specifically, in a non-limiting successful prototype, was designed to couple to a spot size of about 5 μm by 10 μm, though other spot sizes are within the scope of present implementations and hence dimensions of waveguides 111, 150 can be selected based on a spot size of optical signal 165. In general, a range of ellipticity of optical signal 165 is between about 1.5:1 and 3:1 with a smallest dimension (e.g. short elliptical axis) in a range of about 2 μm to 5 μm. Widths and separation of each of ends 149, 151 can selected accordingly; as well a length of each of waveguides 150, as well as tapered region 133 can be selected to maximize optical coupling of optical signal 165 in each of waveguides 150 into waveguide 111. Indeed, selection of dimensions of device 101 can occur using given dimensions of a spot size of optical signal 165 and optical modeling software and/or through trial and error and/or heuristically.

Indeed, in a successful prototype designed to receive a spot size of about 5 μm×10 μm, the theoretical loss was about 1 dB at a wavelength of 1550 nm, and the measured loss for the functioning version of a non-limiting prototype was about 1.6 dB.

It is notes that the prior art device of N. Hatori, et al., "A novel spot size convertor for hybrid integrated light sources on photonics-electronics convergence system," presented at the 8th IEEE Int. Conf. Group IV Photonics, San Diego, Calif., USA, Aug. 2012, Paper ThB2, showed a loss of around 2.5 dB, as compared to the presently described prototype. While a device-to-device comparison is not completely accurate, as the device of Hatori is specifically designed for butt-coupling with a laser, the present device can have better coupling efficiencies than the device of Hatori. Furthermore, the present device is more flexible than Hatori and does not rely on butt-coupling to a laser. Indeed, the device of Hatori specifically depends on butt-coupling to a laser and hence is very sensitive to alignment there between. The present device can generally be less sensitive to alignment with optical signal 165 than the device of Hatori.

Furthermore, the present three-waveguide structure as described herein of the above supports a fundamental mode. At least one lens 170 is used to focus optical signal 165 (e.g. a laser mode) onto ends 149, 151 of waveguides 111, 150 at edge 105 (e.g. a PIC facet) which are configured to receive and/or produce the same spot size (e.g. when light is being transmitted towards edge 105 through first waveguide 111) and therefore transfer maximum power from laser 160 into the fundamental mode edge 105. By increasing the width of the central first waveguide 111 over the length of tapered region 133, and decreasing the width of the outer pair of second waveguides 150 over the length of tapered region 133, the fundamental mode of optical signal 165 is gradually evolved such that the power is increasingly concentrated in center waveguide 111, as the optical signal 165 couples from waveguides 150 into waveguide 111. At the end of tapered region 133 (e.g. at and/or adjacent constant-width region 131), negligible power of optical signal 165 remains in "outer" waveguides 150, and they are terminated. The mode of optical signal 165 is now in a configuration (e.g. spot size) compatible with subsequent structures of device 101.

Figure 3:
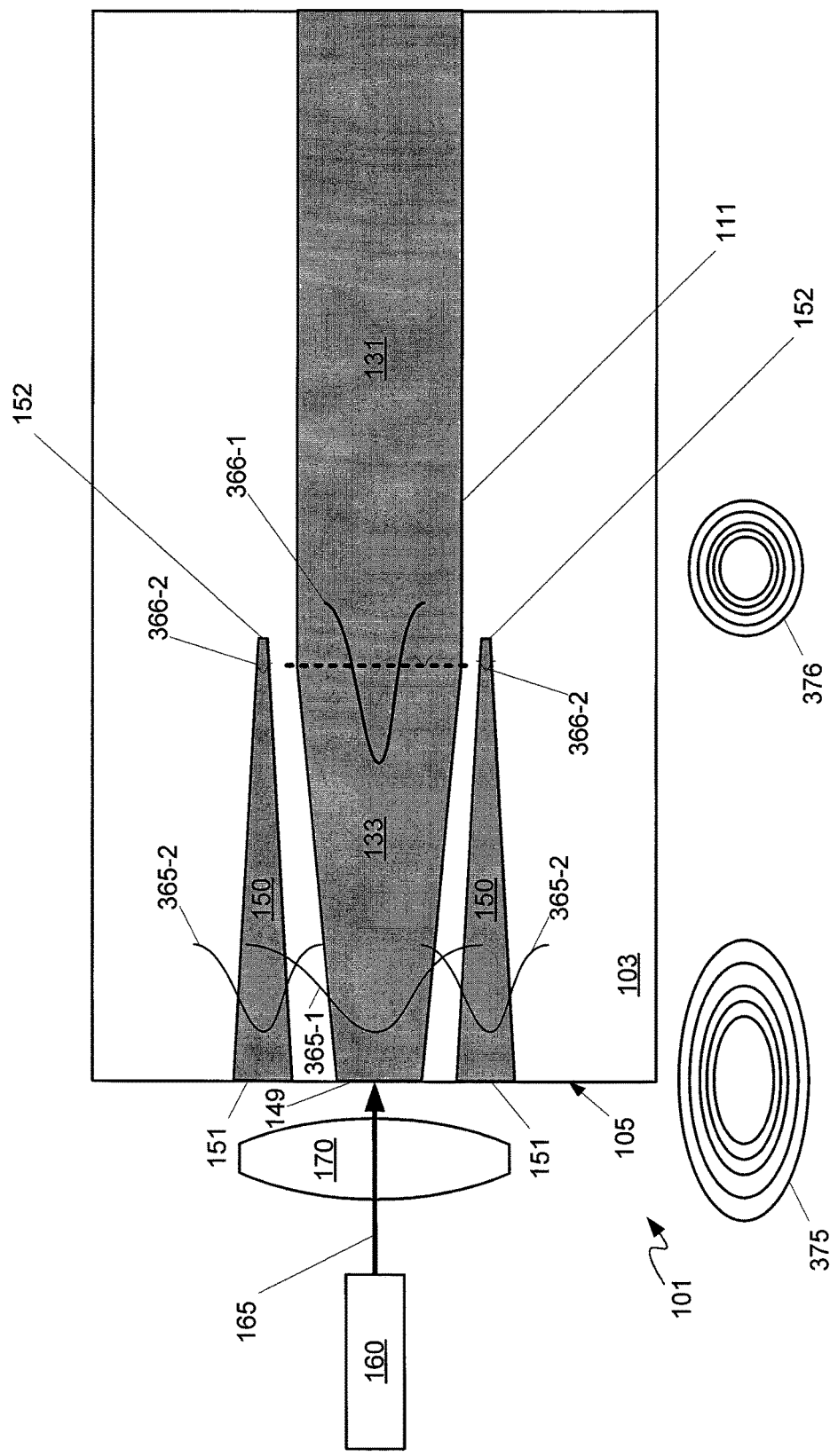
FIG. 3 depicts behaviour of optical signals in the device of FIG. 1, according to non-limiting implementations.

For example, attention is next directed to FIG. 3 which is substantially similar to FIG. 1, with like elements having like numbers. However, in FIG. 3, strength of portions of optical signal 165 in each of waveguides 111, 150 is depicted at different locations, as well as cross-sections of optical signal 165 at edge 105 and in constant-width region 131.

Specifically, strengths 365-1, 365-2 respectively represent a strength of optical signal 165 in each of waveguides 111, 150 as optical signal 165 is received into ends 149, 151 of waveguides 111, 150, and strengths 366-1, 366-2 respectively represent a strength of optical signal 165 in each of waveguides 111, 150 as optical signal 165 has coupled from waveguides 150 into waveguides 111.

In other words, as optical signal 165 travels through tapered region 133 and waveguides 150 towards constant-width region 131, a portion of optical signal in waveguides 150 couples into waveguide 111 transferring the energy in waveguides 150 to waveguide 111. Hence, in general, optical signal 165 in each of waveguides 150 couples into waveguide 111 adiabatically, which is further promoted by each of waveguides 150 being tapered.

FIG. 3 further depicts an elliptical cross-section 375 of optical signal 165 at edge 105, similar to that depicted in FIG. 2, and a cross-section 376 of optical signal 165 once optical signal has entered constant-width region 131 (e.g. cross-section 376 of a confined mode of first waveguide 111 in constant-width region 131). In general, as optical signal 165 traverses tapered region 133 and waveguides 150, optical signal changes towards the confined mode of first waveguide 111 in constant-width region 131 as edges of optical signal 165 couple from waveguides 150 into waveguide 111. Hence, the structure of device 101 transitions a mode of optical signal 165 in first waveguide 111 from an elliptical mode at edge 105 towards a confined mode of first waveguide 111 in constant-width region 131. Furthermore, the confined mode in constant-width region 131 is compatible with optical circuits in device 101. As such, dimensions of waveguide 111 are selected so that cross-section 376 of optical signal 165 is generally compatible with such optical circuits, and dimensions of waveguides 150 are selected to transition and/or couple energy at the edges of elliptical cross-section 375 of optical signal 165 at edge 105 into cross-section 376 of optical signal 165.

It is further noted that a length of each of waveguides 150 are generally selected to maximize adiabatic losses between waveguides 111, 150. However, waveguides 150 generally terminate proximal the intersection between constant-width region 131 and tapered region 133 of waveguide 111, though waveguides 150 can extend to just before or just after the interface and need not be exactly aligned. The length can be selected by optical modeling and/or heuristically, but is generally a length at which strength of optical signal 165 is minimized in waveguides 150 as optical signal travels from edge 105 into waveguides.

It is noted that in FIGS. 1 to 3, each of pair of second waveguides 150 is symmetrically tapered about a longitudinal axis from edge 105 to adjacent an interface between constant-width region 131 and tapered region 133 of first waveguide 111.

Figure 4:
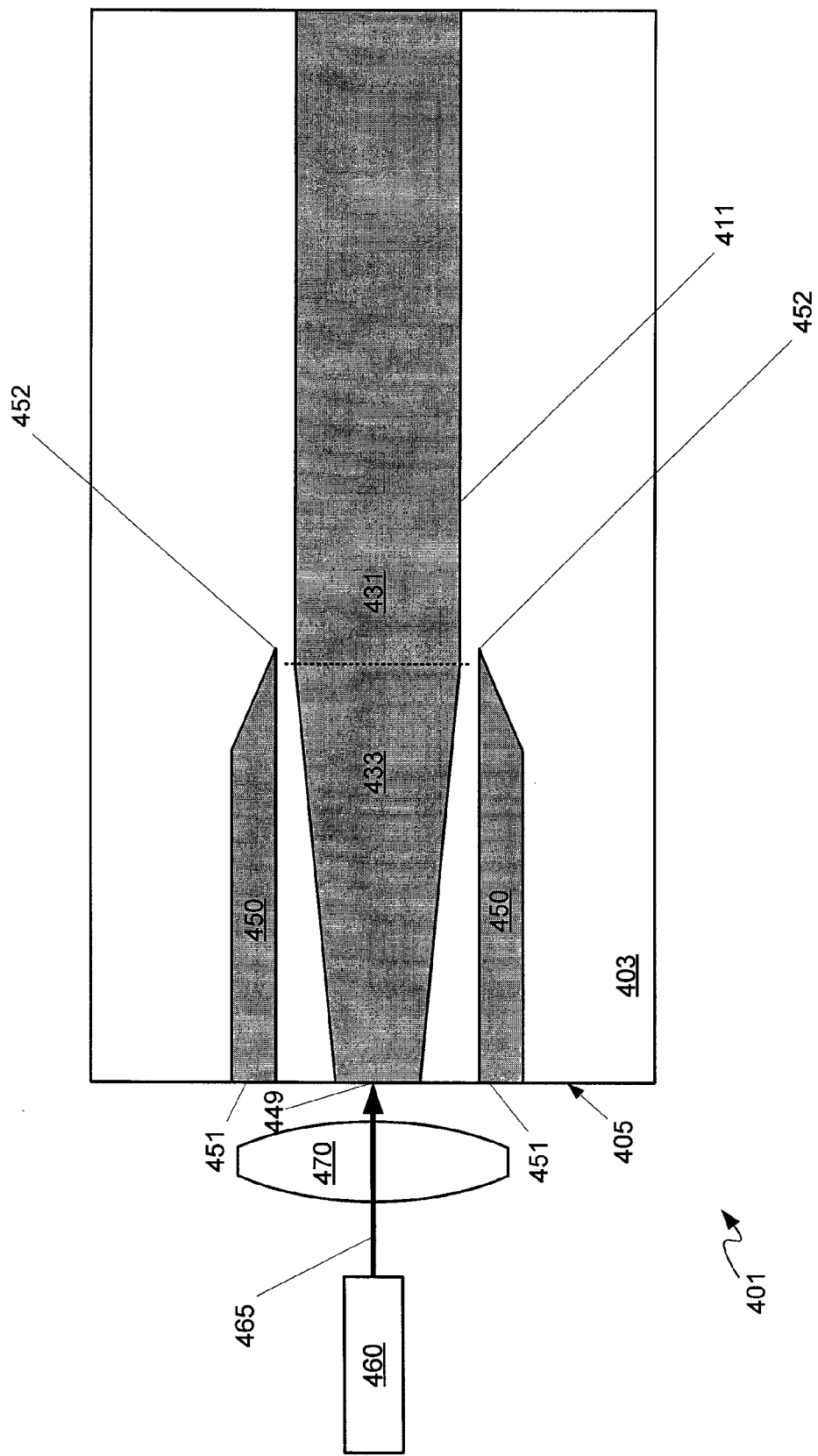
FIG. 4 depicts a top perspective view of an adiabatic elliptical optical coupler device, according to alternative non-limiting implementations.

However, other implementations are within the scope of present implementations. For example, attention is next directed to FIG. 4, which is substantially similar to FIG. 1, with like elements having like numbers, however in a "400"

series rather than a "100" series. Hence FIG. 4 depicts a device 401 comprising: a substrate 403 having an edge 405; a first waveguide 411 on substrate 403, first waveguide 411 comprising a constant-width region 431 and a tapered region 433 terminating at edge 405 of substrate 403, tapered region 433 having a smaller width at edge 405 (e.g. at an end 449) than at constant-width region 431; and, a pair of second waveguides 450 on substrate 403, and located on either side of tapered region 433 of first waveguide 411, each of the pair of second waveguides 450 terminating at edge 405 at a first end 451 and extending to a second end 452 adjacent constant-width region 431 of first waveguide 411, second end 452 distal first end 451; at least a portion of each of the pair of the second waveguides 450 being tapered, and optically coupled to first waveguide 411 to transition a mode of an optical signal in first waveguide 411 from an elliptical mode at edge 405 towards a confined mode of first waveguide 111 in constant-width region 431. FIG. 4 further depicts a laser 460 emitting an optical signal 465, and at least one lens 470. However, in contrast to device 101, in device 401 each of the pair of second waveguides 450 has a constant-width region at edge 405 and a tapered region proximal to the interface between constant-width region 431 and tapered region 433 of first waveguide 411. Otherwise coupling between waveguides 450 and waveguide 411 is similar to device 101.

Figure 5:
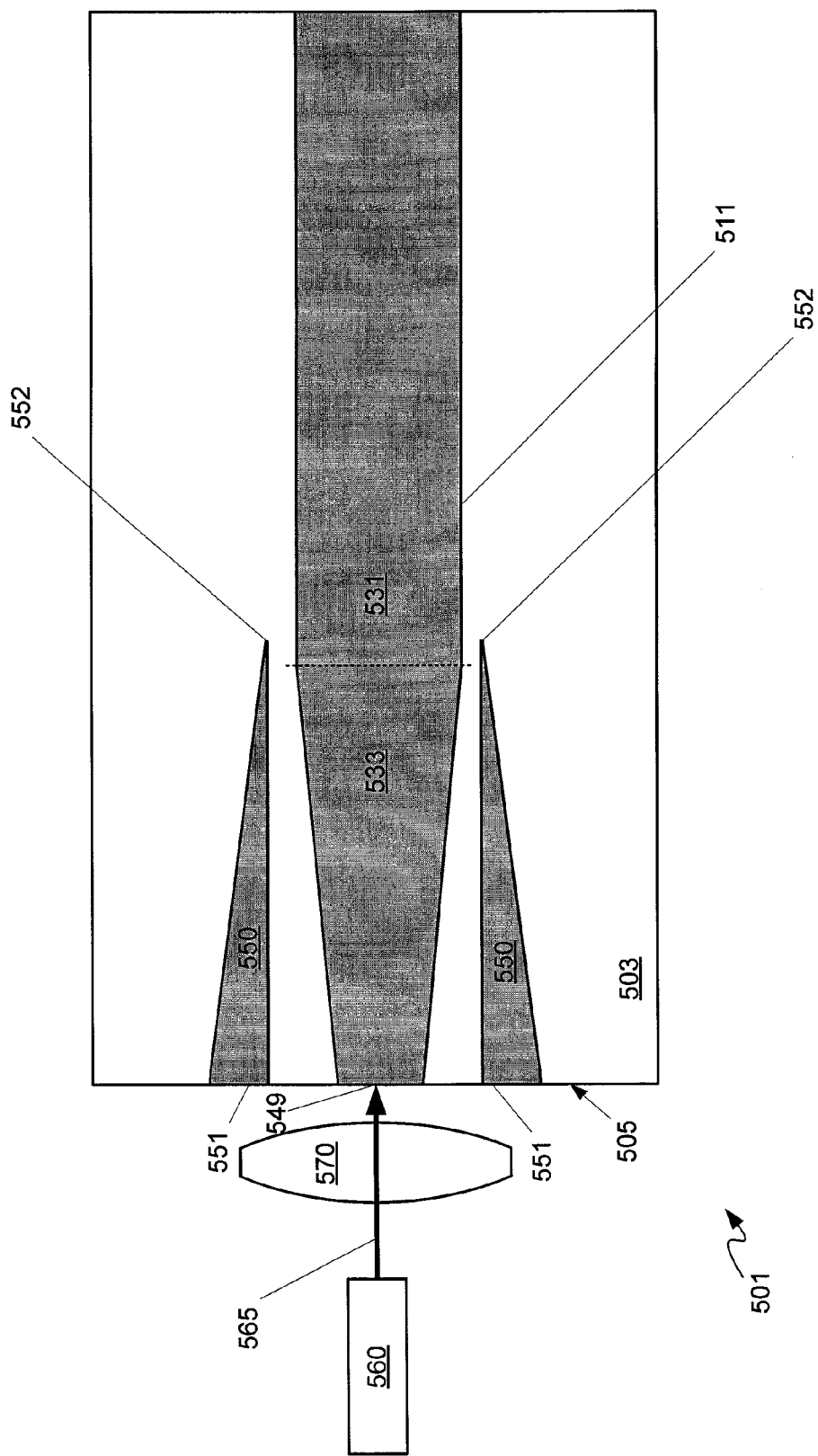
FIG. 5 depicts a top perspective view of an adiabatic elliptical optical coupler device, according to alternative non-limiting implementations.

Yet further implementations are within the scope of present implementations. For example, attention is next directed to FIG. 5, which is substantially similar to FIG. 1, with like elements having like numbers, however in a "500" series rather than a "100" series. Hence FIG. 5 depicts a device 501 comprising: a substrate 503 having an edge 505; a first waveguide 511 on substrate 503, first waveguide 511 comprising a constant-width region 531 and a tapered region 533 terminating at edge 505 of substrate 503, tapered region 533 having a smaller width at edge 505 (e.g. at an end 549) than at constant-width region 531; and, a pair of second waveguides 550 on substrate 503, and located on either side of tapered region 533 of first waveguide 511, each of the pair of second waveguides 550 terminating at edge 505 at a first end 551 and extending to a second end 552 adjacent constant-width region 531 of first waveguide 511, second end 552 distal first end 551; at least a portion of each of the pair of the second waveguides 550 being tapered, and optically coupled to first waveguide 511 to transition a mode of an optical signal in first waveguide 511 from an elliptical mode at edge 505 towards a confined mode of first waveguide 111 in constant-width region 531. FIG. 5 further depicts a laser 560 emitting an optical signal 565, and at least one lens 570. However, in contrast to device 101, in device 501 each of the pair of second waveguides 550 have inner edges (e.g. adjacent waveguide 511) that are parallel and the tapering occurs at an outer edge. Otherwise coupling between waveguides 550 and waveguide 511 is similar to device 101.

Persons skilled in the art will appreciate that there are yet more alternative implementations and modifications possible. For example, while not depicted, any of waveguides 150, 450, 550 can have more than one end and/or tip at an edge of substrate, as can tapered regions of waveguides 111, 411, 511, such that any of each device described herein can have comprise more than three optical ends at a respective edge of a respective substrate. In other words, one or more of tapered regions of waveguides 111, 411, 511, and waveguides 150, 450, 550, can comprise branches that terminate at an edge of a substrate and that merge along a length of tapered regions of waveguides 111, 411, 511.

In any event, various configurations for the pair of outer waveguides in devices described herein are within the scope of present implementations, and the actual configuration can be selected based on optical modeling and/or heuristically. Regardless, the configuration is selected to maximize coupling between the outer waveguides and a central waveguide, to minimize coupling losses and to transition an optical signal from a generally elliptical mode towards a confined mode of first waveguide. Furthermore, in each configuration, ends of the waveguides at an edge of the device are generally located along a common line at the edge of the substrate (e.g. along the PIC facet).

Persons skilled in the art will appreciate that there are yet more alternative implementations and modifications possible, and that the above examples are only illustrations of one or more implementations. The scope, therefore, is only to be limited by the claims appended hereto.

What is claimed is:
1. A device comprising:
a substrate having an edge;
a first waveguide on the substrate, the first waveguide comprising a constant-width region and a tapered region terminating at the edge of the substrate, the tapered region having a smaller width at the edge than at the constant-width region; and,
a pair of second waveguides on the substrate, and located on either side of the tapered region of the first waveguide, each of the pair of the second waveguides terminating at the edge at a first end and extending to a second end adjacent the constant-width region of the first waveguide, the second end distal the first end; at least a portion of each of the pair of second waveguides being tapered, and optically coupled to the first waveguide to transition a mode of an optical signal in the first waveguide from an elliptical mode at the edge towards a confined mode in the first waveguide in the constant-width region, each of the pair of second waveguides having a larger width at the edge than adjacent an interface between the constant-width region and the tapered region of the first waveguide.

2. The device of claim 1, wherein each of the pair of second waveguides is symmetrically tapered about a longitudinal axis from the edge to adjacent the interface between the constant-width region and the tapered region of the first waveguide.

3. The device of claim 1, wherein a width of each of the pair of second waveguides at the edge is smaller than a respective width of the first waveguide at the edge.

4. The device of claim 1, wherein each of the pair of second waveguides is tapered, with the larger width at the edge and a smaller width adjacent the interface between the constant-width region and the tapered region of the first waveguide.

5. The device of claim 1, wherein each of the pair of second waveguides comprises: a respective constant-width region extending from the edge; and a tapered region extending from the constant-width region, the tapered region becoming narrower adjacent the interface between the constant-width region and the tapered region of the first waveguide.

6. The device of claim 1, wherein each of the pair of second waveguides comprises inner edges adjacent the first waveguide that are parallel and tapering of each of the pair of second waveguides occurs at an outer edge.

7. The device of claim 1, wherein each of the substrate, the first waveguide and the pair of second waveguides comprises silicon.

8. The device of claim 1, wherein each of the substrate, the first waveguide and the pair of second waveguides comprises a photonic integrated circuit.

9. The device of claim 1, further comprising an optical circuit in communication with the first waveguide located at an end opposite the tapered region.

10. The device of claim 1, further comprising an optical device optically coupled to first waveguide and the pair of second waveguides at the edge, the optical device configured to receive optical output therefrom, the optical output comprising the elliptical mode.

11. The device of claim 10, wherein the optical device comprises a semiconductor optical amplifier (SOA) or an external cavity laser (ECL).

12. The device of claim 1, further comprising a laser configured to output the optical signal having the elliptical mode towards the edge.

13. The device of claim 1, further comprising a laser aligned with the tapered region of the first waveguide at the edge.

14. The device of claim 1, further comprising: a laser configured to output the optical signal having the elliptical mode towards the edge; and at least one lens located between the laser and the edge, the at least one lens configured to focus the optical signal on respective ends of each of the first waveguide and the pair of second waveguides.

15. The device of claim 14, wherein the at least one lens is further configured to collimate the optical signal prior to focussing the optical signal on the respective ends of each of the first waveguide and the pair of second waveguides.

16. The device of claim 14, wherein the laser and at least one lens are centered on respective ends of each of the first waveguide and the pair of second waveguides.

* * * * *